United States Patent [19]
Koyama

[11] Patent Number: 5,448,306
[45] Date of Patent: Sep. 5, 1995

[54] IMAGE PROCESSING APPARATUS WITH VARIABLE CLAMPING

[75] Inventor: Shinichi Koyama, Tokyo, Japan

[73] Assignee: Canon Kabushiki Kaisha, Tokyo, Japan

[21] Appl. No.: 78,115

[22] Filed: Jun. 18, 1993

[30] Foreign Application Priority Data

Jun. 30, 1992 [JP] Japan .................................. 4-196586

[51] Int. Cl.⁶ .......................... H04N 5/52; H04N 5/18
[52] U.S. Cl. ..................................... 348/678; 348/695; 348/255
[58] Field of Search ................. 358/174, 172, 171, 34, 358/37; H04N 5/16, 5/18, 5/20, 5/52, 5/53; 348/678, 695, 696, 690, 691, 679, 680, 681, 682, 683, 684, 685, 255, 257

[56] References Cited

U.S. PATENT DOCUMENTS

| 4,625,240 | 11/1986 | Yablonski | 358/174 |
| 4,665,402 | 5/1987 | Young | 342/91 |
| 4,799,106 | 1/1989 | Moore et al. | 358/174 |
| 4,807,035 | 2/1989 | Sayliss | 358/174 |
| 4,831,378 | 5/1989 | Baars et al. | 358/174 |
| 4,860,100 | 8/1989 | Rakhodai et al. | 358/172 |
| 4,970,594 | 11/1990 | Kitaura | 358/174 |
| 4,989,074 | 1/1991 | Matsumoto et al. | 358/174 |
| 5,121,117 | 6/1992 | Rabii | 358/174 |
| 5,194,943 | 3/1993 | Tomita et al. | 348/255 |
| 5,235,424 | 8/1993 | Wagner | 358/174 |

FOREIGN PATENT DOCUMENTS

| 6542 | 1/1991 | Japan | 358/174 |
| 226184 | 10/1991 | Japan | H04N 5/16 |

*Primary Examiner*—James J. Groody
*Assistant Examiner*—Chris Grant
*Attorney, Agent, or Firm*—Fitzpatrick, Cella, Harper & Scinto

[57] ABSTRACT

Image processing apparatus wherein the level of an input analog picture signal from an imaging device is controlled by gain control circuitry, and the gain-controlled analog signal is then converted into a digital signal. Feedback clamping is performed by generating an error signal by subtracting a target value from the digital signal, and then adding the error signal to the gain-controlled analog signal. Correct clamping is made possible by allowing the target value to be varied based upon the gain set by the gain control means.

40 Claims, 8 Drawing Sheets

BACK PORCH
(BLACK LEVEL)

HORIZONTAL BLANKING PERIOD

IMAGE PROCESSING APPARATUS WITH VARIABLE CLAMPING

BACKGROUND OF THE INVENTION

1. Field of the Invention

The present invention relates to an imaging apparatus, and more specifically, to a type of imaging apparatus such as a VCR integrated with a digital video camera, in which a picture signal obtained from an imaging device is converted into a digital signal by an A/D converter so that the signal can be digitally processed and recorded on a recording medium.

2. Description of the Related Art

A known type of video camera performs clamping in such a manner that a black level of a picture signal output from an imaging device is clamped at a constant level regardless of the magnitude of the level.

Especially for a digital video camera among video cameras having the above mentioned clamping function, clamping with the following construction has been proposed: An error signal to be described below is added to an analog image signal from the imaging device to coordinate the black level of the analog signal with a target clamping level. Subsequently, the analog signal is converted into a digital signal, and a target clamping value is subtracted from the converted digital signal. Then, the resultant signal is outputted as a clamped signal. The black level during the A/D conversion process is set a little distant from a lower limit level. A signal of the black level period is extracted from the resultant digital signal. Then, the extracted signal is averaged and integrated. The integrated signal is then fed back as an error signal corresponding to the difference between the digital signal output from the A/D conversion process and the target black level. This error signal then is added to the analog signal before the A/D conversion. By the above described means, a kind of feed back clamping of the digital signal has been conducted.

In the above mentioned conventional digital video camera, when the level of the analog image signal from the imaging device is low, the analog signal is converted into a digital signal by raising the level by an amplifier or the like. However, when the level of the analog signal is raised by the amplifier, noise (random noise) carried in the black-level area in the analog signal is amplified also. When the A/D conversion of the analog signal carrying the noise is executed, the noise in the negative area which has a greater amplitude than the lower limit level of the A/D converter is totally eliminated during the A/D conversion. This type of signal in which the noise in the negative area is eliminated does not have well-balanced noise in both the positive and negative areas. As described before, the signal which is to be added to the analog signal before the A/D conversion is obtained by averaging the resultant signal and integrating the same. Therefore, when the error signal of the black-level area is extracted along with carrying the un-balanced positive-and-negative noises, and when the average value of the extracted signal is obtained subsequently, the value of the averaged signal becomes greater than the actual value because the noise component in the positive area is greater than that in the negative area. When the signal having the above mentioned incorrect value is fed back and added to the analog signal before the A/D conversion, the black level in the analog signal cannot reach the desired level, different from the set level, thus producing a problem in that a totally correct clamping cannot be performed.

SUMMARY OF THE INVENTION

In order to overcome the above-described problems, the present invention is aimed at providing an imaging apparatus which enables a correct clamping.

According to one aspect of the present invention, image processing apparatus for processing an input analog image signal comprises: gain control means for controlling the level of the input analog image signal by the gain being set based upon the level of the analog image signal output from the gain control means; A/D conversion means for converting the analog image signal output from the gain control means into a digital image signal; and processing means for processing the digital image signal and a reference signal having a level being varied based upon the gain of the gain control means.

According to another aspect of the present invention, an imaging apparatus comprises: imaging means for converting object light into an analog image signal; gain control means for controlling the level of the analog image signal output from the imaging means by the gain being set based upon the analog image signal output from the gain control means; A/D conversion means for converting the analog image signal output from the gain control means into a digital image signal; processing means for adding a reference signal having a level different from a level of the analog image signal output from the gain control means to the digital image signal; and control means for controlling the level of the reference signal based upon the gain of the gain control means, in which the control means further controls the gain of the gain control means.

According to yet a further aspect of the present invention, image processing apparatus for processing an input analog image signal comprises: gain control means for controlling the level of the input analog image signal by the gain being set based upon the level of the analog image signal output from the gain control means; A/D conversion means for converting the analog image signal output from the gain control means into a digital image signal; comparing means for comparing a level of a reference signal which has a level different from a level of the analog image signal output from the gain control means with the level of the digital image signal; and processing means for adding an error signal which corresponds to the signal output from the comparing means to the analog image signal output from the gain control means, in which the level of the reference signal is varied based upon the gain of the gain control means.

These and other objects, features and advantages of the present invention will become more apparent from the following description of the preferred embodiment taken in conjunction with the accompanying drawings.

BRIEF DESCRIPTION OF THE DRAWINGS

FIGS. 3A,3B,3C, and 3 D comprise four waveform charts, each illustrating A/D conversion in the circuit previously shown in FIG. 1;

DESCRIPTION OF THE PREFERRED EMBODIMENT

A detailed description of a preferred embodiment of the present invention will now be given in conjunction with the accompanying drawings.

Figure 1:
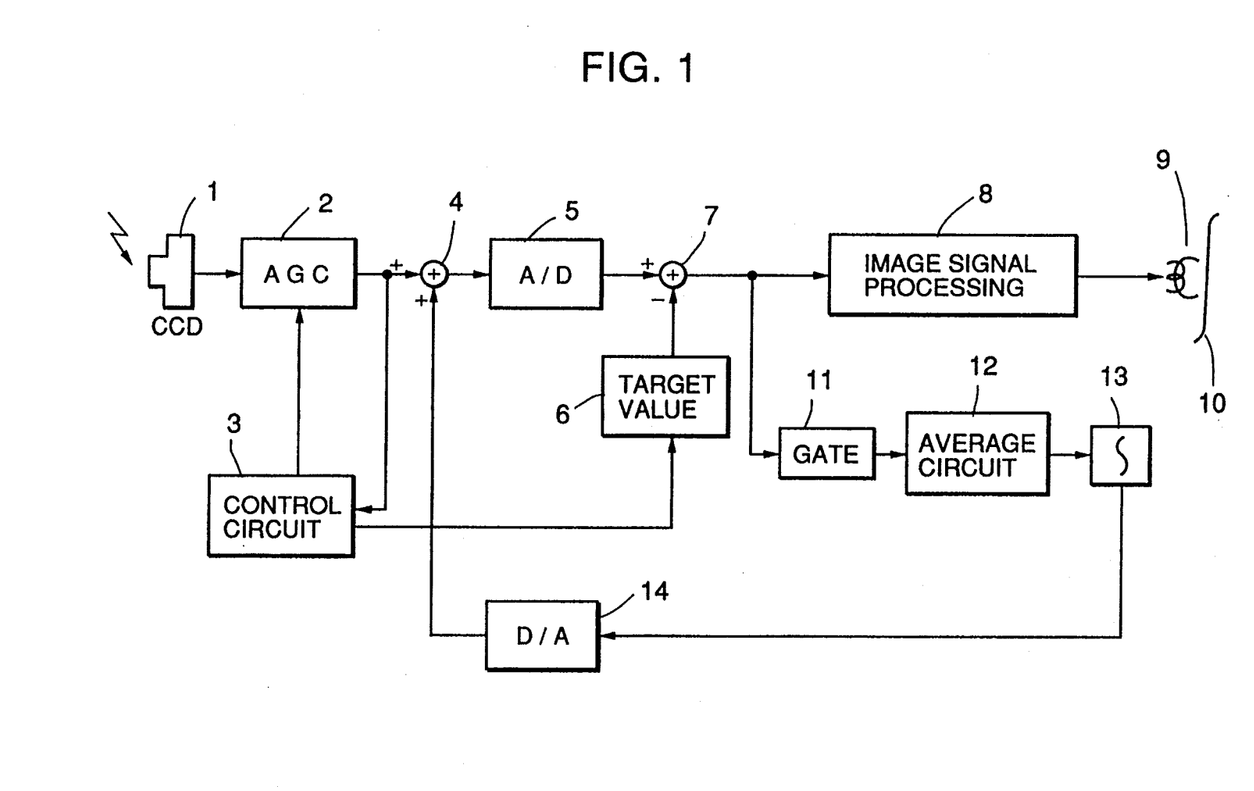
FIG. 1 is a circuit block diagram illustrating an embodiment of a VTR integrated with a digital video camera according to the present invention.

FIG. 1 is a circuit block diagram of an embodiment of a VTR integrated with a digital video camera according to the present invention. In FIG. 1, a detailed illustration of such portions that bear no relation to the present invention is omitted.

A description of the recording operation of a image signal of the apparatus of the present invention will now be given. As shown in FIG. 1, an analog image signal acquired by an imaging device 1 such as a CCD is transmitted to an AGC (Automatic Gain Control) circuit 2 which controls the level by a predetermined gain in accordance with the level of an inputted analog image signal. Then, the AGC circuit 2 outputs the analog signal into an adding circuit 4. In the adding circuit 4, an output signal from D/A conversion circuit 14 which will be described later is added to the analog signal in which the level is controlled to set a black level in the analog signal at a target value for clamping. The output of the adding circuit 4 is converted into a digital signal by an A/D conversion circuit 5, wherein the digital signal is converted into an 8-bit (256 level) digital signal.

By means of a subtracting circuit 7, target value 6 of the black-level clamping which will be described later is subtracted from the digital signal which was converted by the A/D conversion circuit 5. Then, the resultant signal is outputted to an image signal processing circuit 8 as a clamped signal. Subsequently, predetermined signal processing is applied to the clamped signal by the image signal processing circuit 8, and the clamped signal is converted into a signal suitable for the digital recording, thus enabling a magnetic head 9 to record the thus-processed signal on a magnetic tape 10.

Figure 4:
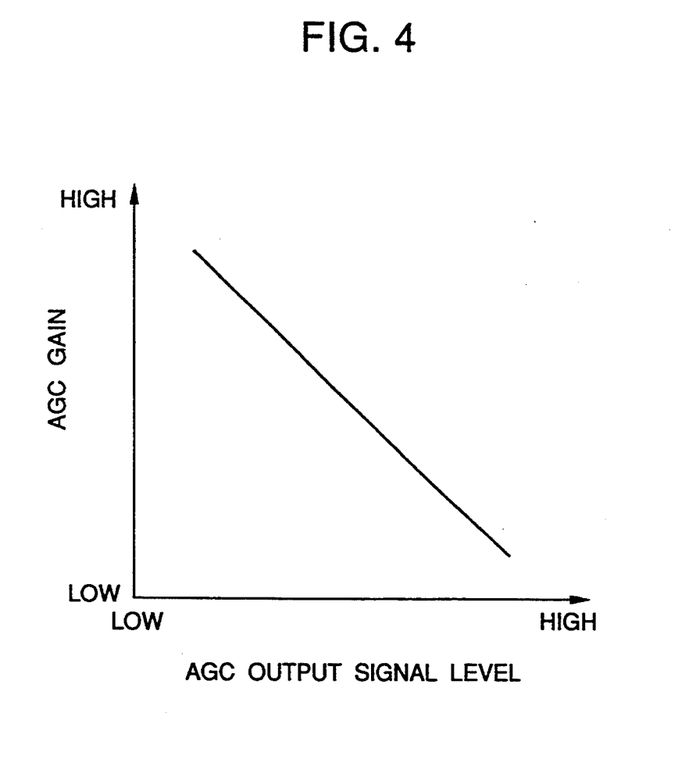
FIG. 4 is a chart illustrating the relationship of the levels between the gain of an AGC circuit previously shown in FIG. 1 and an AGC output signal.

The output signal of the AGC circuit 2 is also inputted into a control circuit 3 which controls the gain of the AGC circuit 2 based upon the level of the input analog signal. As shown in FIG. 4, the control circuit 3 outputs a control signal to the AGC circuit 2 to raise the gain of the AGC circuit 2 when the level of the output signal in the AGC circuit 2 becomes low; but to lower the gain when the level of the output signal in the AGC circuit 2 is high.

The output signal of subtracting circuit 7 is also outputted to a gate circuit 11 in which a signal of the black-level period is extracted from the signal outputted from in the subtracting circuit 7. The extracted signal of the black-level period is equal to a value resulting from subtracting the target value 6 from the black-level area of the digital signal. The extracted signal becomes an error signal representing the error between the target value and the black-level value of the signal actually converted by the A/D conversion circuit 5. As described before, the random noise is included in the error signal. To eliminate the random noise signal, an average value is obtained by the averaging circuit 12 and an integrating circuit 13. The obtained value is converted into an analog signal by the D/A conversion circuit 14, and outputted into the adding circuit 4. In the adding circuit 4, the black level of this analog signal is controlled in accordance with the error by adding the error signal to the analog signal outputted from the AGC circuit 2. Namely, it is made possible to set the black level of the analog signal constant at about the lower-limit level of the A/D conversion circuit 5 by: lowering the black level of the analog signal inputted into the A/D conversion circuit 5 when the black level of the digital signal, after the A/D conversion, is higher than the target value 6; and raising the black level of the analog signal when the black level of the digital signal is lower than the target value 6. Accordingly, a feed-back clamp circuit for the digital signal comprises the adding circuit 4, the A/D conversion circuit 5, the target value 6, the subtracting circuit 7, the gate circuit 11, the averaging circuit 12, the integrating circuit 13, and the D/A conversion circuit 14.

Figure 2A:
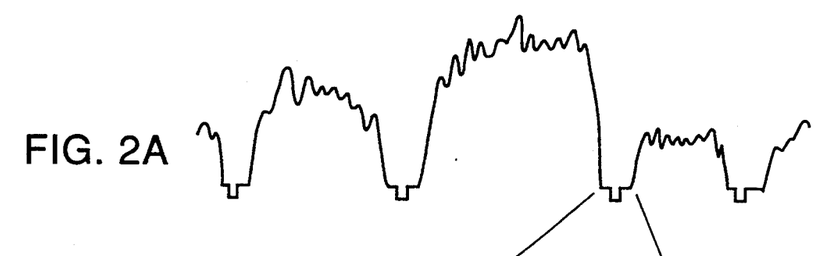
FIGS. 2A and 2B comprise a waveform chart illustrating a black-level signal of an analog image signal.
Figure 2B:
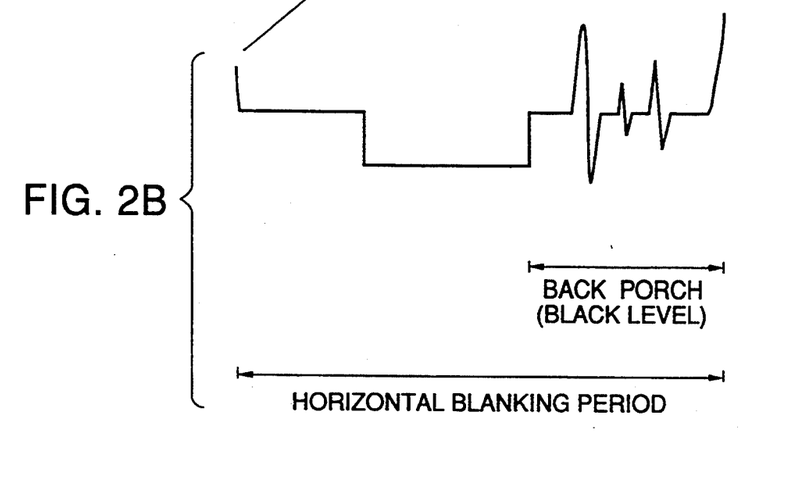
Figure 3A:
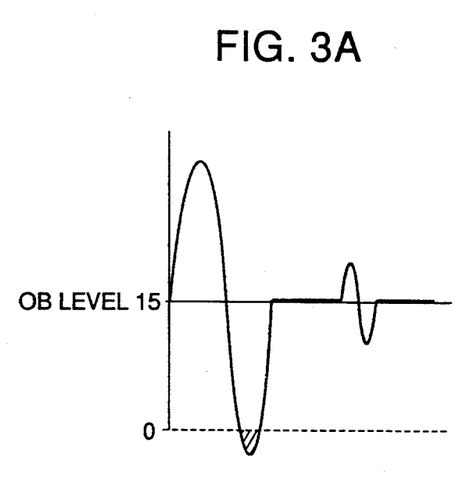
Figure 3B:
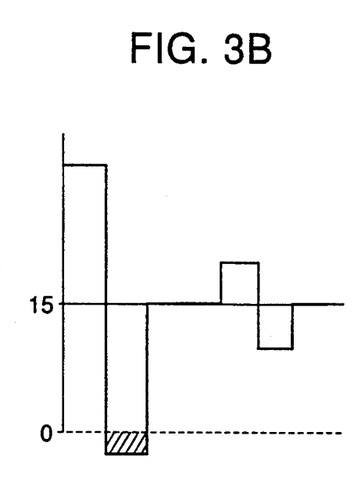

In FIG. 2A, an area of the above-mentioned black level in the A/D conversion circuit 5 is shown, wherein a horizontal blanking period in a video signal is represented in FIG. 2B. The signal to be extracted in the gate circuit 11 is represented as a back porch area shown in FIG. 2B. The random noise is carried on the back porch area. FIGS. 3A and 3B represent wave-form charts of the A/D conversion when the level 15 in the A/D conversion circuit 5 becomes the black level as an OB (Optical Black) level. When a gain of the AGC circuit 2 becomes higher, the level of the signal from the CCD 1 is controlled in the AGC circuit 2, wherein the level of noise carried on the signal in the black-level area as shown in FIG. 2B becomes higher. When a signal, which carries a noise on a level lower than the lower limit of the A/D conversion circuit 5 as shown in FIGS. 3A and 3B, is inputted into the black-level signal as the analog signal, the shaded portion in the FIGS. 3A and 3B is eliminated below the lower limit level of the A/D conversion circuit 5 during the performance of the A/D conversion. When the target value 6 is subtracted from the signal in which the above mentioned shaded portion has been eliminated, and then the average value of the black-level signal is obtained, the average value becomes higher than the actual value because a positive area's noise component is greater than a negative area's component. Therefore, correct clamping cannot be conducted.

In the embodiment of the present invention, the correct clamping can be performed by using the control circuit 3 to control the target value 6 in accordance with the output level of the AGC circuit 2.

Figure 3C:
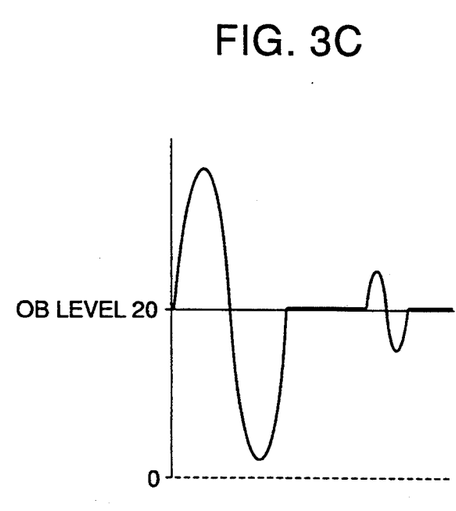
Figure 3D:
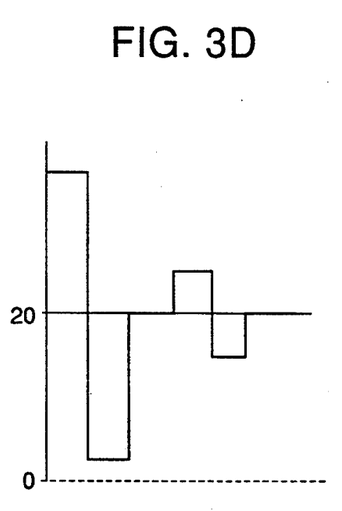

When the target value 6 is raised, the error signal extracted by the gate circuit 11 is relatively in a negative area. Therefore, the output of the D/A conversion circuit 14, which is obtained from the average value of the error signal and its integration, becomes greater in the positive area. By adding the positive signal to the output signal of the AGC circuit 2, the black level of the analog signal inputted into the A/D conversion circuit 5 is consequently raised, as shown in FIGS. 3C and 3D. The OB level reaches level 20 in the FIGS. 3C and 3D. When the OB level in the A/D conversion is raised, a large enough distance is generated between the OB level and the lower limit level. Therefore, the signal will not be eliminated at a zero level even when the same analog signal as the one set forth in the FIGS. 3A and 3B is inputted. A correct digital signal, which has well-balanced positive-and-negative noise components, can be obtained as the digital signal after the A/D conversion. Therefore, the average value of the signal in the black-level area of the error signal, wherein the target value 6 is subtracted from the digital signal, will not differ from the actual value due to the well-balanced positive-and-negative noise components. Thus, a correct error-signal can be obtained by the output of the D/A conversion circuit 14. Accordingly, the analog signal can be controlled at a proper level and correct clamping is enabled by adding the correct error signal to the analog signal in the adding circuit 4.

Figure 5A:
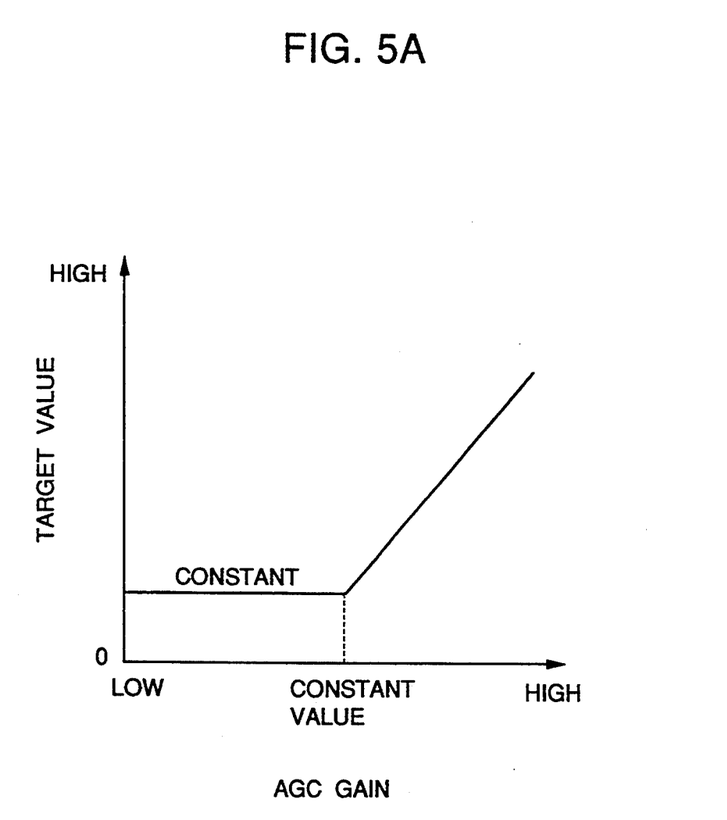
FIGS. 5A, 5B, and 5C comprise three charts, each illustrating the relationship between the gain of the AGC circuit previously shown in FIG. 1 and a target value.
Figure 5B:
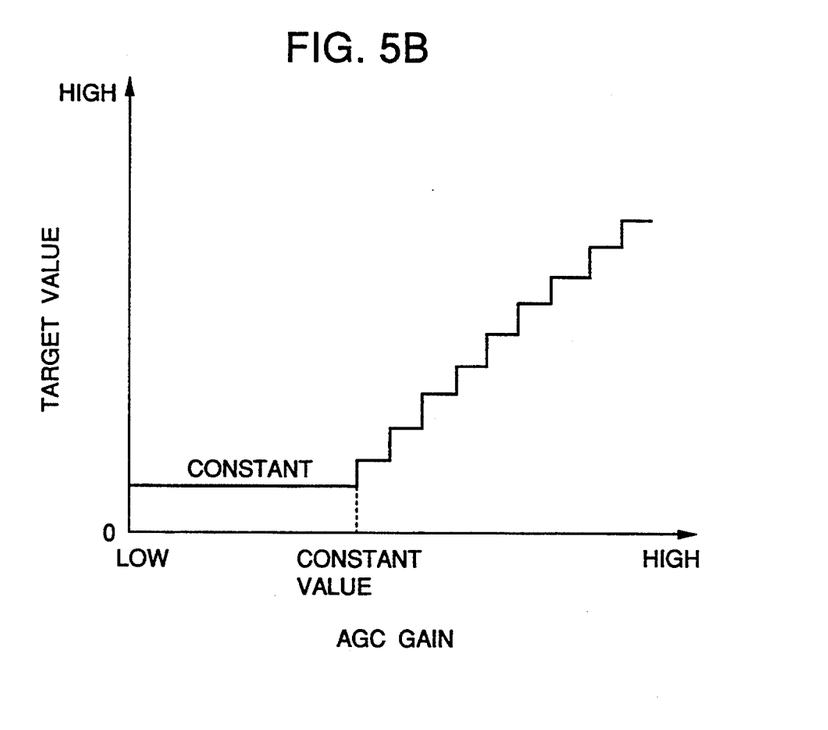

FIGS. 5A, 5B, and 5C show the relationship between the target value of the clamp and the gain of the AGC circuit 2. As shown in FIG. 5A, for modifying the target value 6, the target value 6 of the clamp is set at a value close to the lower limit level of the A/D conversion circuit 5 when the AGC gain is lower than a predetermined value. The target value 6 is raised when the gain raises above the predetermined value, thus preventing the negative component of the noise from being eliminated at the zero level during the A/D conversion. To actually modify the target value 6, the relationship between the target value 6 and the gain should have configuration such that the gain will be changed by steps when it rises above the predetermined value because the subtracting signal is the digital signal as shown in FIG. 5B.

Figure 5C:
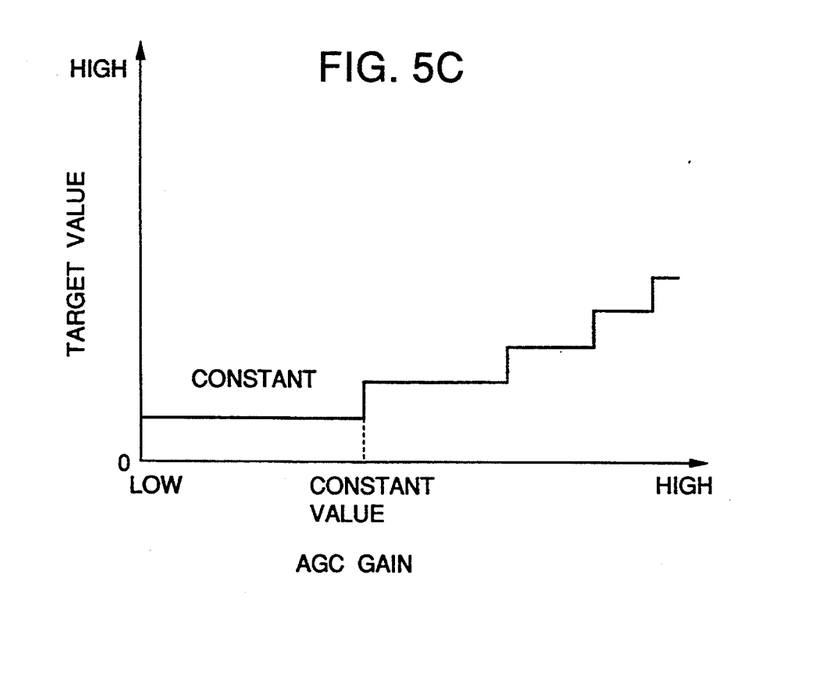

The target value 6 can be modified in accordance with the condition of the analog image signal so that the target value has the characteristics as represented in FIG. 5C. When the gain is lower, it can be modified in a wide step due to the narrow variation of the noise level. As it gets higher, the gain can be modified in a narrower step due to the wider variation of the noise level. Thus, proper control of the target value 6 is enabled.

Figure 6:
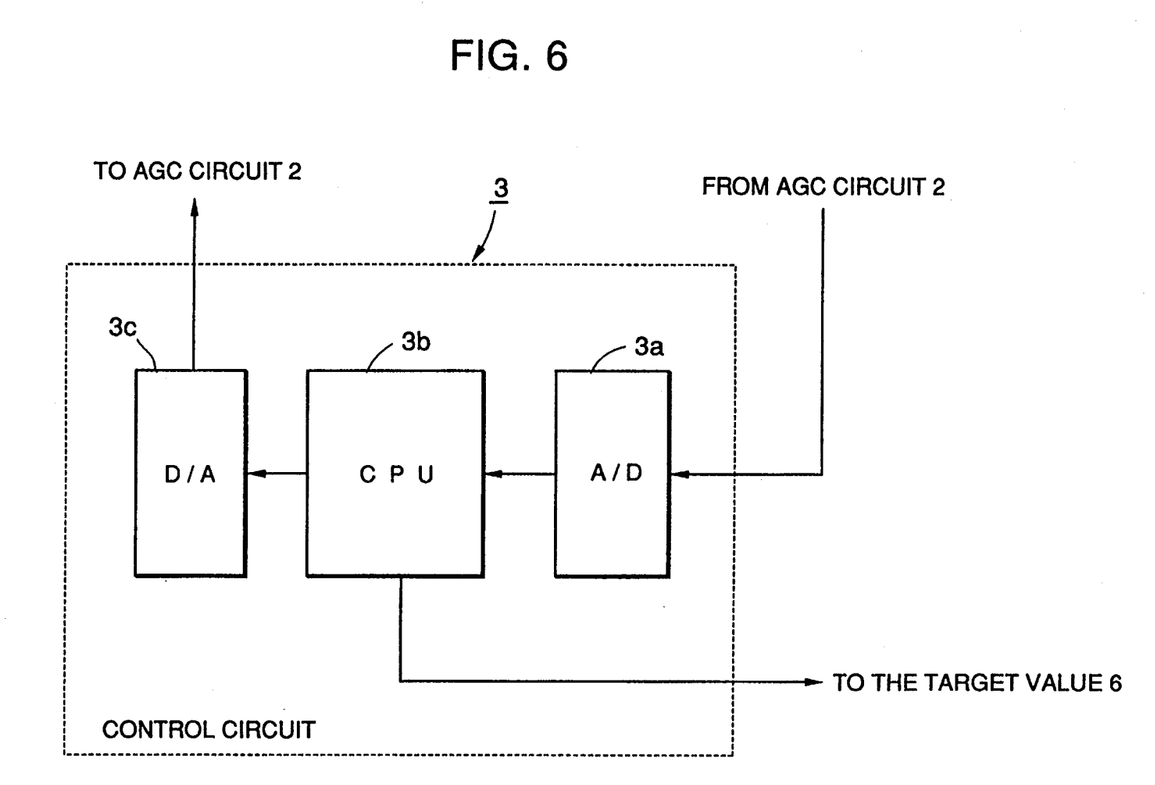
FIG. 6 is a circuit block diagram of the a control circuit previously shown in FIG. 1.
Figure 7:
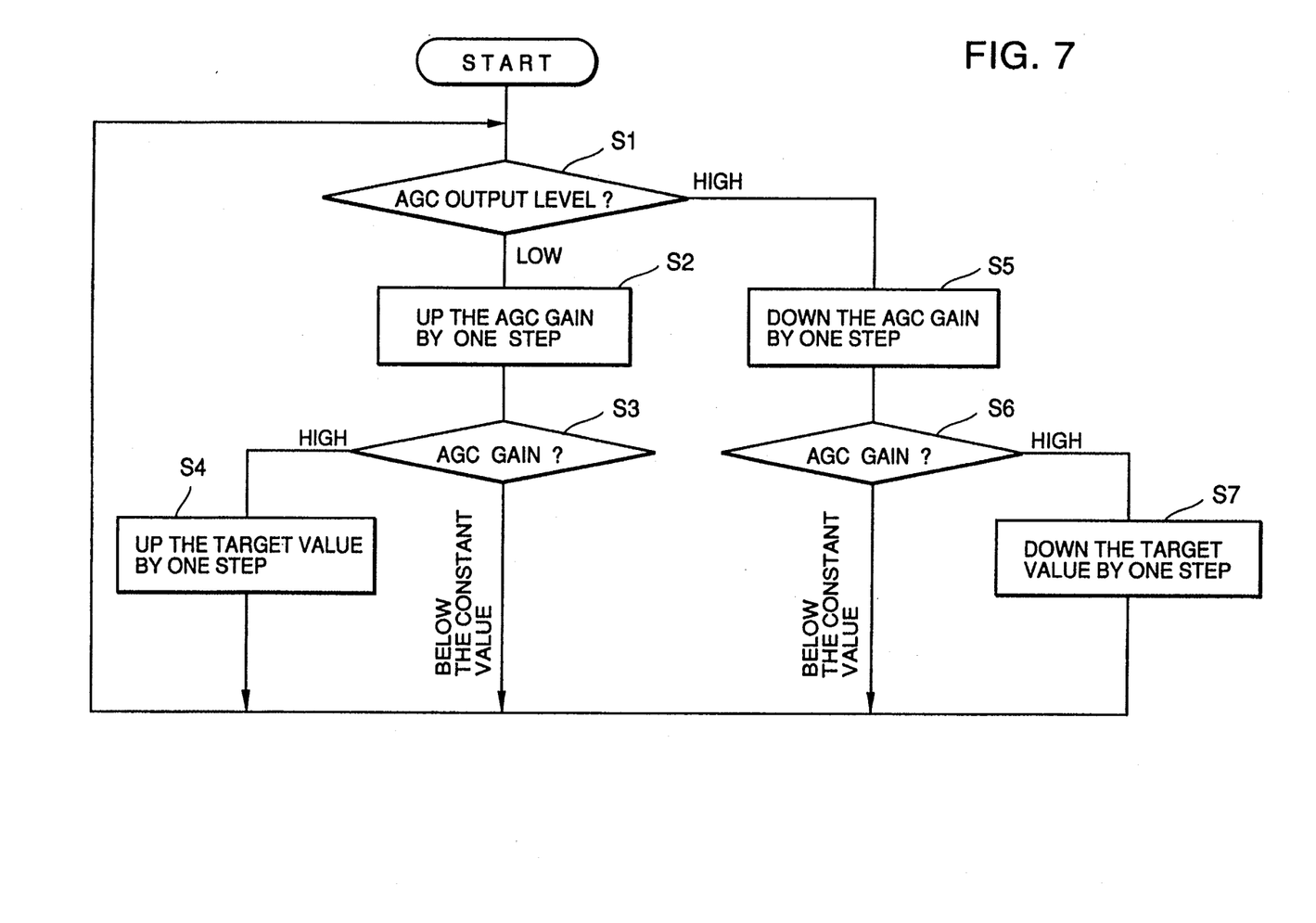
FIG. 7 is a flow chart illustrating the operation of the control circuit previously shown in FIG. 1.

FIGS. 6 and 7 show the control of the target value 6 by the control circuit 3. FIG. 6 is a circuit block diagram of the control circuit 3. FIG. 7 is a flow chart illustrating the operation of the control circuit 3.

The output signal of the AGC circuit 2 is converted into the digital signal in an A/D converter 3a in the control circuit 3. Then, the level of the output signal is checked by a CPU 3b (S1). Subsequently, when the level of the signal is lower, the control signal for raising the gain of the AGC circuit 2 is outputted to the D/A converter 3c (S2) which outputs the control signal to the AGC circuit 2. Thus, the level of the analog signal from the CCD1 can be controlled by the gain. Subsequently, the CPU 3b does not modify the target value 6 of the clamp when the set gain is lower than a constant value; but it raises the target value 6 by one step when the gain is above the constant value as previously shown in FIG. 6 (S3, S4). On the contrary, when the level of the input analog signal of the A/D converter 3a is higher, the control signal for lowering the gain of the AGC circuit 2 is outputted to the D/A converter 3c (S5). Subsequently, the CPU 3b does not modify the target value 6 of the clamp when the set gain is lower than a constant value; but it lowers the target value 6 by one step when the gain is above the constant value (S6, S7). Accordingly, the CPU 3b constantly supervises the level of the output signal in the AGC circuit 2, and controls the gain of the AGC circuit 2 and the target value 6 of the clamp based upon the above-mentioned supervision of the level.

From the foregoing, it will be apparent in this embodiment that due to the positive control of the black level of the analog signal based upon the gain of the AGC circuit 2, the noise in the negative area cannot be eliminated when an amplitude of the random noise becomes greater and exceeds the lower limit of the A/D conversion circuit 5 caused by an increase in the gain of the AGC circuit 2. Therefore, when the average value of the output of the gate circuit 11 is being obtained, the noise in both the negative and the positive areas are averaged. Thus, the correct value of the error signal can be successfully obtained and the correct clamping can be constantly achieved.

In the preferred embodiment of the present invention, the control circuit 3 comprises the CPU 3b, which is constructed as a microcomputer. However, it is to be understood that the invention is not intended to be limited to the specific embodiments. In general, the AGC circuit 2 is constructed of a feedback loop of a simple analog circuit; therefore, it is also possible to produce hardware in which: the control signal is outputted to the target value 6; a table of several steps of the target value is provided; and the table is selected in accordance with the level of the aforementioned gain of the AGC circuit 2. This type of the hardware will have the same effect as the one described in the preferred embodiment.

The individual components shown in outline or designated by blocks in the drawings are all well-known in the image processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Image processing apparatus for processing an input analog image signal, comprising:
    a) gain control means for controlling a level of the input analog image signal;
    b) A/D conversion means for converting the analog image signal output from said gain control means into a digital image signal; and
    c) modifying means for modifying a level of said digital image signal by using a reference signal, said modifying means including subtracting means for obtaining a difference between the digital image signal and the reference signal, said modifying means varying a level of the reference signal and a level of said gain control means, said modifying means varying the level of the reference signal in accordance with the level of said gain control means, said modifying means being capable of modifying said digital image signal level irrespective of the digital image signal.

2. An imaging apparatus, comprising:
    a) imaging means for converting object light into an analog image signal;

b) gain control means, coupled to said imaging means, for controlling the level of the analog image signal output from said imaging means;

c) A/D conversion means, coupled to said gain control means, for converting the analog image signal output from said gain control means into a digital image signal;

d) processing means, coupled to said gain control means, for obtaining a difference between adding a reference signal and said digital image signal output from said A/D conversion means; and e) control means, coupled to said processing means and to said gain control means, for controlling the level of said reference signal in accordance with the gain of said gain control means, and for controlling the gain of said gain control means.

3. An imaging apparatus according to claim 2, wherein said control means raises the gain of said gain control means when the level of said analog image signal output from said gain control means is low, and lowers the gain of said gain control means when the level of said analog image signal output from said gain control means is high.

4. An imaging apparatus according to claim 2, wherein said control means lowers the level of the reference signal when the level of said analog signal output from said gain control means is low, and raises the level of the reference signal when the level of said analog signal output from said gain control means is high.

5. An imaging apparatus according to claim 2, further comprising signal generating means for generating an error signal based upon a signal output from said processing means, said signal generating means including averaging means for averaging the signals output from said processing means for a predetermined period of time.

6. An imaging apparatus according to claim 5, wherein said signal generating means further comprises an integrating circuit which integrates a signal output from said averaging means.

7. An imaging apparatus according to claim 5, further comprising second processing means for adding said error signal and said analog signal output from said gain control means, and wherein said A/D conversion means converts the analog signal output from said second processing means into a digital signal.

8. An imaging apparatus according to claim 2, wherein the level of the reference signal is close to the lower limit level of said A/D conversion means.

9. An imaging apparatus according to claim 2, further comprising signal processing means for performing a predetermined signal processing on the signal output from said processing means.

10. An imaging apparatus according to claim 9, further comprising a recording means for recording the signal output from said signal processing means on a recording medium, and wherein said recording means includes a rotating head.

11. Image processing apparatus for processing an input analog image signal, comprising:

a) gain control means for controlling the level of the input analog image signal;

b) A/D conversion means for converting the analog image signal output from said gain control means into a digital image signal;

c) processing means for processing the digital image signal and a reference signal; and d) adding means for adding an error signal which corresponds to the signal output from said processing means to said analog image signal output from said gain control means, said processing means varying the level of the reference signal in accordance with the gain of said gain control means.

12. An apparatus according to claim 11, wherein said processing means includes a subtracting circuit for subtracting the reference signal from the digital image signal, and wherein said error signal corresponds to a signal output from said subtracting circuit.

13. An apparatus according to claim 12, further comprising D/A conversion means for converting the error signal into an analog error signal.

14. An apparatus according to claim 11, further comprising imaging means for converting object light into the input analog image signal.

15. An apparatus according to claim 14, further comprising:
signal processing means for performing a predetermined signal processing on the digital image signal output from said processing means.

16. An apparatus according to claim 15, further comprising:
recording means for recording the digital image signal output from said signal processing means on a recording medium.

17. An apparatus according to claim 16, wherein said recording medium comprises a magnetic tape.

18. A signal processing apparatus, comprising:

a) gain control means for controlling a level of a received analog image signal, and for converting the received analog image signal into a digital image signal; and b) modifying means for modifying a level of the digital image signal by using a reference signal, said modifying means including subtracting means for obtaining a difference between the digital image signal and the reference signal, said modifying means varying a level of the reference signal according to the level set by said gain control means, said modifying means being capable of modifying the level of the digital image signal irrespective of the digital image signal.

19. An apparatus according to claim 18, wherein said subtracting means includes a subtracting circuit for subtracting the reference signal from the digital image signal.

20. An apparatus according to claim 18, further comprising:
imaging means for converting object light into the received analog image signal.

21. An apparatus according to claim 20, further comprising:
signal processing means for performing a predetermined signal processing on the digital image signal output from said modifying means.

22. An apparatus according to claim 21, further comprising:
recording means for recording the digital image signal output from said signal processing means on a recording medium.

23. An apparatus according to claim 22, wherein said recording medium comprises a magnetic tape.

24. A signal processing apparatus, comprising:

a) gain control means for controlling a level of a received analog image signal, and for converting the received analog image signal into a digital image signal; and b) modifying means for modifying a level of the digital image signal by using a reference signal, said modifying means including subtracting means for obtaining a difference between the digital image signal and the reference signal, said modifying means varying a level of the reference signal and a level of said gain control means,, said modifying means being capable of modifying the level of the digital image signal irrespective of the digital image signal.

25. An apparatus according to claim 24, wherein said subtracting means includes a subtracting circuit for subtracting the reference signal from the digital image signal.

26. An apparatus according to claim 24, further comprising:
imaging means for converting object light into the received analog image signal.

27. An apparatus according to claim 26, further comprising:
signal processing means for performing a predetermined signal processing on the digital image signal output from said modifying means.

28. An apparatus according to claim 27, further comprising:
recording means for recording the digital image signal output from said signal processing means on a recording medium.

29. An apparatus according to claim 28, wherein said recording medium comprises a magnetic tape.

30. A signal processing apparatus, comprising:
(a) gain control means for controlling a level of a received analog image signal, and for converting the received analog image signal into a digital image signal; and
(b) modifying means for modifying a level of the digital image signal by using a reference signal, said modifying means including subtracting means for obtaining a difference between the digital image signal and the reference signal, said modifying means varying a level of the reference signal and a level of said gain control means, said modifying means includes a control means for controlling the level of the reference signal according to the level of said gain control means, said modifying means being capable of modifying the level of the digital image signal irrespective of the digital image signal.

31. A signal processing apparatus, comprising:

a) first level adjusting means for controlling a level of a received analog image signal, and for converting the analog image signal into a digital image signal;

b) second level adjusting means for adjusting a level of the digital image signal, said second level adjusting means including subtracting means for obtaining a difference between the digital image signal and a reference signal; and c) control means for controlling said first and second level adjusting means, said control means being capable of controlling an operation of said second level adjusting means irrespective of the digital image signal.

32. An apparatus according to claim 31, wherein said subtracting means includes a subtracting circuit for subtracting a reference signal from the digital image signal.

33. An apparatus according to claim 32, wherein said control means controls a level of said first level adjusting means and a level of the reference signal.

34. An apparatus according to claim 33, wherein said control means controls the level of the reference signal according to the level of said first level adjusting means.

35. An apparatus according to claim 31, wherein said first level adjusting means includes (i) a gain control circuit for controlling the level of the received analog image signal, and (ii) an A/D converter for converting the analog image signal into a digital image signal, said gain control means controlling the level of the received analog image signal in accordance with the level of the analog image signal output from said first level adjusting means.

36. An apparatus according to claim 31, further comprising:
imaging means for converting object light into the received analog image signal.

37. An apparatus according to claim 36, further comprising:
signal processing means for performing a predetermined signal processing on the digital image signal output from said second level adjusting means.

38. An apparatus according to claim 37, further comprising:
recording means for recording the digital image signal output from said signal processing means on a recording medium.

39. An apparatus according to claim 38, wherein said recording medium comprises a magnetic tape.

40. An apparatus according to claim 31 incorporated into a digital VCR.

* * * * *

UNITED STATES PATENT AND TRADEMARK OFFICE
CERTIFICATE OF CORRECTION

PATENT NO. : 5,448,306
DATED : September 5, 1995
INVENTOR(S) : SHINICHI KOYAMA

It is certified that error appears in the above-indentified patent and that said Letters Patent is hereby corrected as shown below:

Column 3, line 8, "the a" should read --the--; and
    line 23, "of a" should read --of an--.

Column 6, line 37, "embodiments," should read --embodiment,--; and
    line 38, "embodiments." should read --embodiment.--.

Column 7, line 9, "adding" should be deleted.

Signed and Sealed this

Thirteenth Day of February, 1996

Attest:

BRUCE LEHMAN

Attesting Officer     Commissioner of Patents and Trademarks